UNITED STATES PATENT OFFICE.

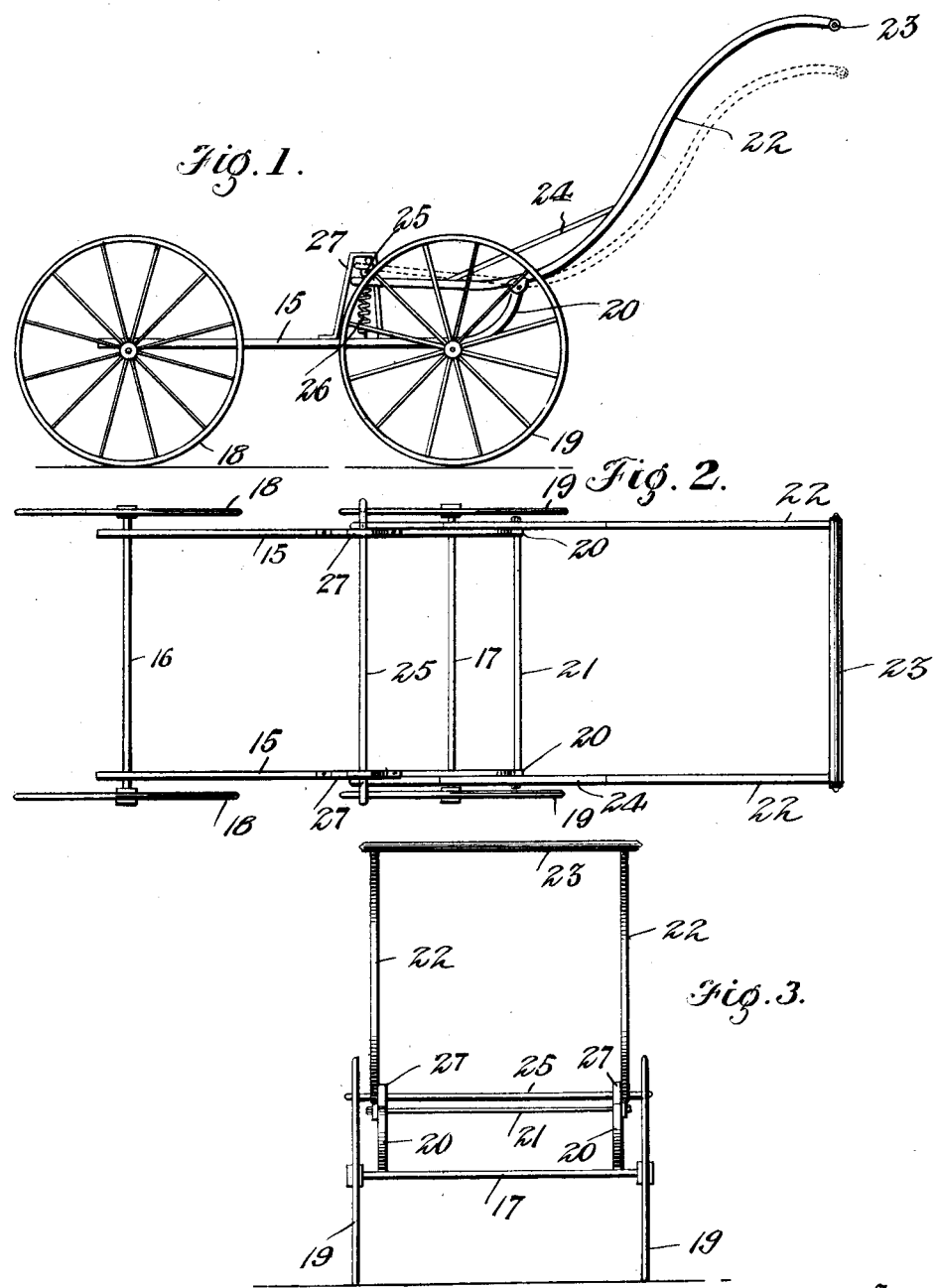

ERNST R. PETERSON AND NAPOLEON MATHSON, OF DOBBS FERRY, NEW YORK.

BRAKE.

1,179,213.   Specification of Letters Patent.   Patented Apr. 11, 1916.

Application filed November 26, 1915. Serial No. 63,671.

*To all whom it may concern:*

Be it known that we, ERNST R. PETERSON and NAPOLEON MATHSON, citizens of Sweden and the United States of America, respectively, residing at Dobbs Ferry, in the county of Westchester and State of New York, have invented new and useful Improvements in Brakes, of which the following is a specification.

This invention relates to brakes for baby carriages, and it has for its object to produce a simple and improved automatic or self-setting brake which will automatically engage the carriage wheels when the propelling handle of the carriage is released, thereby holding the carriage securely against accidental movement when the operator lets go of the handle.

A further object of the invention is to produce a simple and improved automatic brake which will be released by the action of the carriage handle when pushed by the operator for the purpose of propelling the carriage.

A further object of the invention is to simplify and improve the detailed construction of a brake having the characteristics above set forth.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a side elevation showing the running gear of a baby carriage equipped with the improved brake. Fig. 2 is a top plan view of the same. Fig. 3 is a rear elevation.

Corresponding parts in the several figures are denoted by like characters of reference.

The running gear comprises longitudinal frame bars 15, the same being supported on the front and rear axles 16, 17 having the wheels 18, 19. The frame bars 15 are upturned at their rear ends, forming brackets 20, said brackets being connected together by a transverse rod or brace bar 21 on which the handle bars 22 are pivotally mounted, said handle bars being connected together by the round or grip piece 23. The handle bars have been shown as being reinforced by braces 24. The forward ends of the handle bars are connected together by the brake bar 25 which may directly engage the rims of the hind wheels 19, although it is obvious that brake shoes of any well known character may be provided. The forward ends of the handle bars are connected with the frame bars 15 by means of coiled springs 26, whereby said forward ends of the handle bars, as well as the brake bar, will be forced in the direction of the rims of the wheels 19. Keepers 27 are mounted on the frame bars 15, said keepers receiving the projecting ends of the brake bar 25, and said keepers serving also as guards for the springs 26 and to limit the upward movement of the forward ends of the handle bars and the brake bars, thereby avoiding undue tensioning of the springs, whereby the latter might become distorted.

From the foregoing description, taken in connection with the accompanying drawing, it will be readily seen that the brake bar is normally, by the action of the springs 26, maintained in engagement with the rims of the hind wheels 19. The carriage will thus be maintained stationary even when left unguarded on an inclined road or hillside. In pushing the carriage the operator lays hold of the grip piece 23 on which a downward pressure is naturally exerted which will tend to overcome the tension of the springs 26, thereby lifting the brake bar clear of the wheel rims and permitting the carriage to be readily propelled.

The improved brake device, as will be seen, is very simple in its construction and is readily applicable to the running gears for baby carriages of various constructions. Its action is unfailingly automatic, the brake being self-setting at the moment when the handle is let go of by the operator.

Having thus described the invention, what is claimed as new, is:—

A running gear including side bars having upturned rear ends and front and rear wheel carrying axles on which said side bars are supported, suitably connected handle bars pivoted on the upturned rear ends of the side bars, coiled springs connecting the forward ends of the handle bars with the side bars, and a brake bar connecting the handle bars and having end portions engaging the rims of the hind wheels; keepers on the side bars within which the springs and portions of the brake bar are located to limit the rocking movement of the handle bars.

In testimony whereof we affix our signatures in presence of two witnesses.

ERNST R. PETERSON.
NAPOLEON MATHSON.

Witnesses:
CHARLES NELSON,
KARL JOHANSON.

Copies of this patent may be obtained for five cents each, by addressing the "Commissioner of Patents, Washington, D. C."